(12) United States Patent
Beutel

(10) Patent No.: US 7,892,692 B2
(45) Date of Patent: Feb. 22, 2011

(54) FEATURES FOR BARRIER FILM SUPPORT

(75) Inventor: Matthew J. Beutel, Webster, NY (US)

(73) Assignee: GM Global Technology Operations LLC, Detroit, MI (US)

( * ) Notice: Subject to any disclaimer, the term of this patent is extended or adjusted under 35 U.S.C. 154(b) by 55 days.

(21) Appl. No.: 11/972,177

(22) Filed: Jan. 10, 2008

(65) Prior Publication Data

US 2009/0181280 A1 Jul. 16, 2009

(51) Int. Cl.
*H01M 8/02* (2006.01)

(52) U.S. Cl. .................. 429/469; 429/460; 429/463; 429/467; 429/481; 429/508

(58) Field of Classification Search .............. 429/34, 429/469, 460, 463, 467, 481, 508
See application file for complete search history.

(56) References Cited

U.S. PATENT DOCUMENTS

| | | | |
|---|---|---|---|
| 6,663,994 B1 * | 12/2003 | Fly et al. ............... 429/30 |
| 6,720,103 B1 * | 4/2004 | Nagai .................. 429/463 |
| 6,861,173 B2 | 3/2005 | Bhaskar et al. |
| 6,974,648 B2 | 12/2005 | Goebel |
| 7,201,988 B2 | 4/2007 | Dave |
| 7,267,902 B2 * | 9/2007 | Brunk et al. ............ 429/481 |
| 7,279,241 B2 * | 10/2007 | Ketcham et al. ......... 429/12 |
| 2005/0118491 A1 * | 6/2005 | Ramsey et al. .......... 429/39 |
| 2005/0249917 A1 * | 11/2005 | Trentacosta et al. ...... 428/137 |
| 2006/0127706 A1 * | 6/2006 | Goebel et al. .......... 429/12 |
| 2009/0325036 A1 * | 12/2009 | Blank et al. ........... 429/38 |

FOREIGN PATENT DOCUMENTS

WO 2007/088354 * 1/2007

* cited by examiner

*Primary Examiner*—Patrick Ryan
*Assistant Examiner*—Ladan Mohaddes
(74) *Attorney, Agent, or Firm*—Fraser Clemens Martin & Miller LLC; J. Douglas Miller

(57) ABSTRACT

A barrier film for a fuel cell is provided, including a polymeric membrane having a plurality of support features. The support features are adapted to militate against a deflection of the membrane under a pressure differential across the membrane. A fuel cell employing the barrier film has a first plate with a port formed therein, and a second plate disposed adjacent the first plate. The barrier film is disposed between the first plate and the second plate. The support features of the barrier film militate against an intrusion of the membrane into the port. A fuel cell stack formed from a plurality of the fuel cells is also provided.

14 Claims, 4 Drawing Sheets

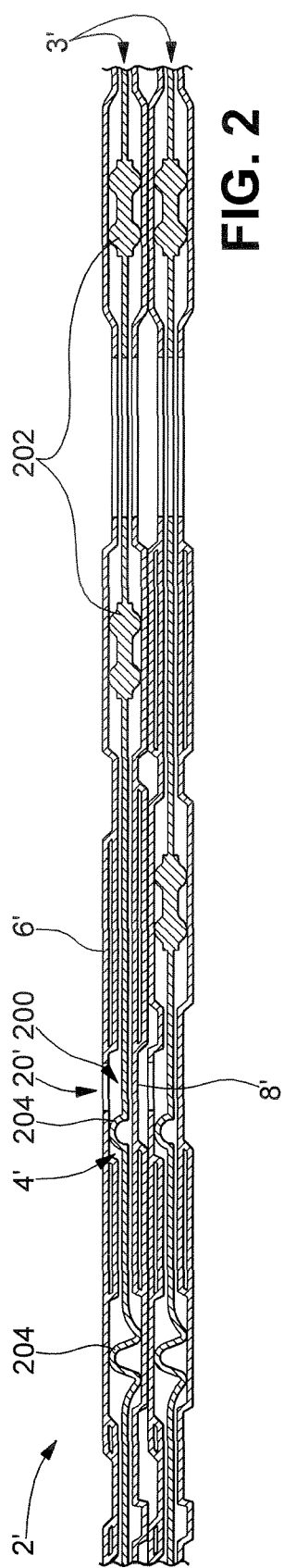
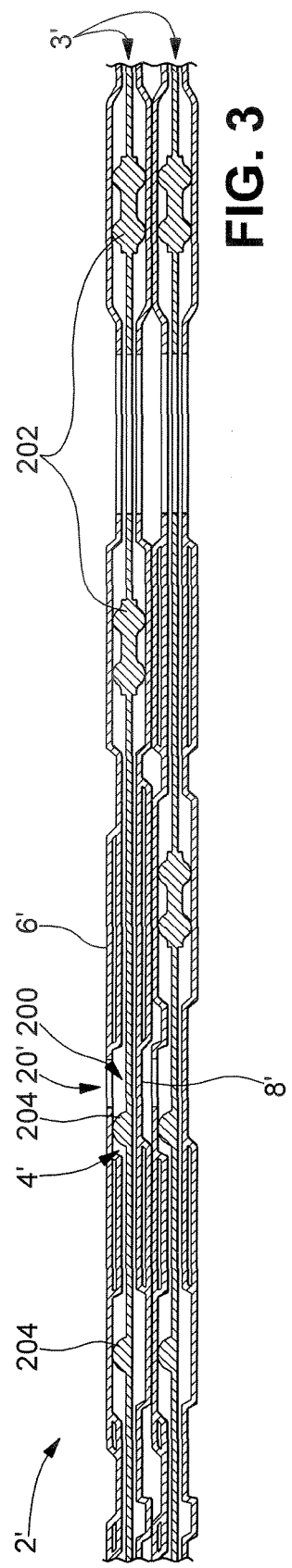

FEATURES FOR BARRIER FILM SUPPORT

FIELD OF THE INVENTION

The present disclosure relates to a fuel cell and, more particularly, to a fuel cell barrier film that minimizes softgood intrusion into a flow field of a fuel cell stack plate.

BACKGROUND OF THE INVENTION

A fuel cell has been proposed as a clean, efficient and environmentally responsible power source for various applications. In particular, individual fuel cells can be stacked together in series to form a fuel cell stack capable of supplying a quantity of electricity sufficient to power an electric vehicle. Accordingly, the fuel cell has been identified as a potential alternative for a traditional internal-combustion engine used in modern vehicles.

A common type of fuel cell is known as a proton exchange membrane (PEM) fuel cell. The PEM fuel cell includes three basic components: a cathode, an anode and an electrolyte membrane. The cathode and anode typically include a finely divided catalyst, such as platinum, supported on carbon particles and mixed with an ionomer. The electrolyte membrane is sandwiched between the cathode and the anode to form a membrane-electrode-assembly (MEA). The MEA is disposed between porous diffusion media (DM). The DM facilitates a delivery of gaseous reactants, typically hydrogen and oxygen from air, to an active region defined by the MEA for an electrochemical fuel cell reaction. Nonconductive gaskets and seals electrically insulate the various components of the fuel cell.

When the MEA and the DM are laminated together as a unit, for example, with other components such as gaskets and the like, the assembly is called a unitized electrode assembly (UEA). The UEA is disposed between fuel cell plates, which act as current collectors for the fuel cell. The UEA components disposed between the fuel cell plates are typically called "softgoods". The fuel cell plate has a feed region that uniformly distributes the gaseous reactants to and between the fuel cells of the fuel cell stack. The feed region may have a broad span that facilitates a joining of the fuel cell plates, e.g., by welding, and a shifting of flows between different elevations within the jointed plates. The feed region includes supply ports that distribute the gaseous reactants from a supply manifold to the active region of the fuel cell via a flow field formed in the fuel cell plate. The feed region also includes exhaust ports that distribute the residual gaseous reactants and products from the flow field to an exhaust manifold.

Lower performing cell (LPC) conditions, fuel cell instability, and degradation due to reactant starvation or non-uniformity of reactant flow have been observed when at least one of the softgood components is forced into the port features in a phenomenon known as "softgood intrusion." Softgood intrusion occurs when there is a pressure differential between a cathode side and an anode side of the barrier film sufficient to deflect the softgoods into the port features. The pressure differential often occurs during normal operation of the fuel cell.

It is known in the art to support the softgoods in the feed region and inhibit softgood intrusion by adding a metal shim or foil. Metal shims have been used to sandwich and sufficiently support the softgoods against deflection. However, the use of metal shims is undesirable since the shims must have a strength and thickness that resists deflection of the softgoods under the pressure differential. The metal shim must also be sufficiently bonded to the softgoods to inhibit a separation therefrom over repeated fuel cell operation. The employment of metal shims undesirably adds to a complexity and cost of the fuel cell.

There is a continuing need for a fuel cell that provides sufficient softgood support without the use of metal shims. Desirably, the fuel cell minimizes softgood intrusion and militates against low performing cell conditions, fuel cell instability, and fuel cell degradation due to reactant starvation or non-uniformity of reactant flow to the fuel cell.

SUMMARY OF THE INVENTION

In concordance with the instant disclosure, a barrier film for a fuel cell that minimizes softgood intrusion and militates against low performing cell conditions, fuel cell instability, and fuel cell degradation due to reactant starvation or non-uniformity of reactant flow to the fuel cell, is surprisingly discovered.

In one embodiment, a barrier film for a fuel cell includes a polymeric membrane having a plurality of support features. The support features are adapted to militate against a deflection of the membrane under a pressure differential across the membrane.

In another embodiment, a fuel cell having the barrier film is provided. The fuel cell includes a first plate having a port formed therein, and a second plate disposed adjacent the first plate. The barrier film is disposed between the first plate and the second plate, and adapted to militate against an intrusion of the membrane into the port during an operation of the fuel cell.

A plurality of the fuel cells may be arranged in series to form a fuel cell stack. The fuel cell stack that has sufficient softgood support without the use of metal shims is thereby provided.

DRAWINGS

The above, as well as other advantages of the present disclosure, will become readily apparent to those skilled in the art from the following detailed description, particularly when considered in the light of the drawings described hereafter.

FIG. 2 is a fragmentary cross-sectional view of a fuel cell stack according to one embodiment of the present disclosure including a feed region having a barrier film with hollow support features;

FIG. 3 is a fragmentary cross-sectional view of a fuel cell stack according to another embodiment of the present disclosure including a feed region having a barrier film with substantially solid support features;

DETAILED DESCRIPTION OF THE INVENTION

Figure 1A:
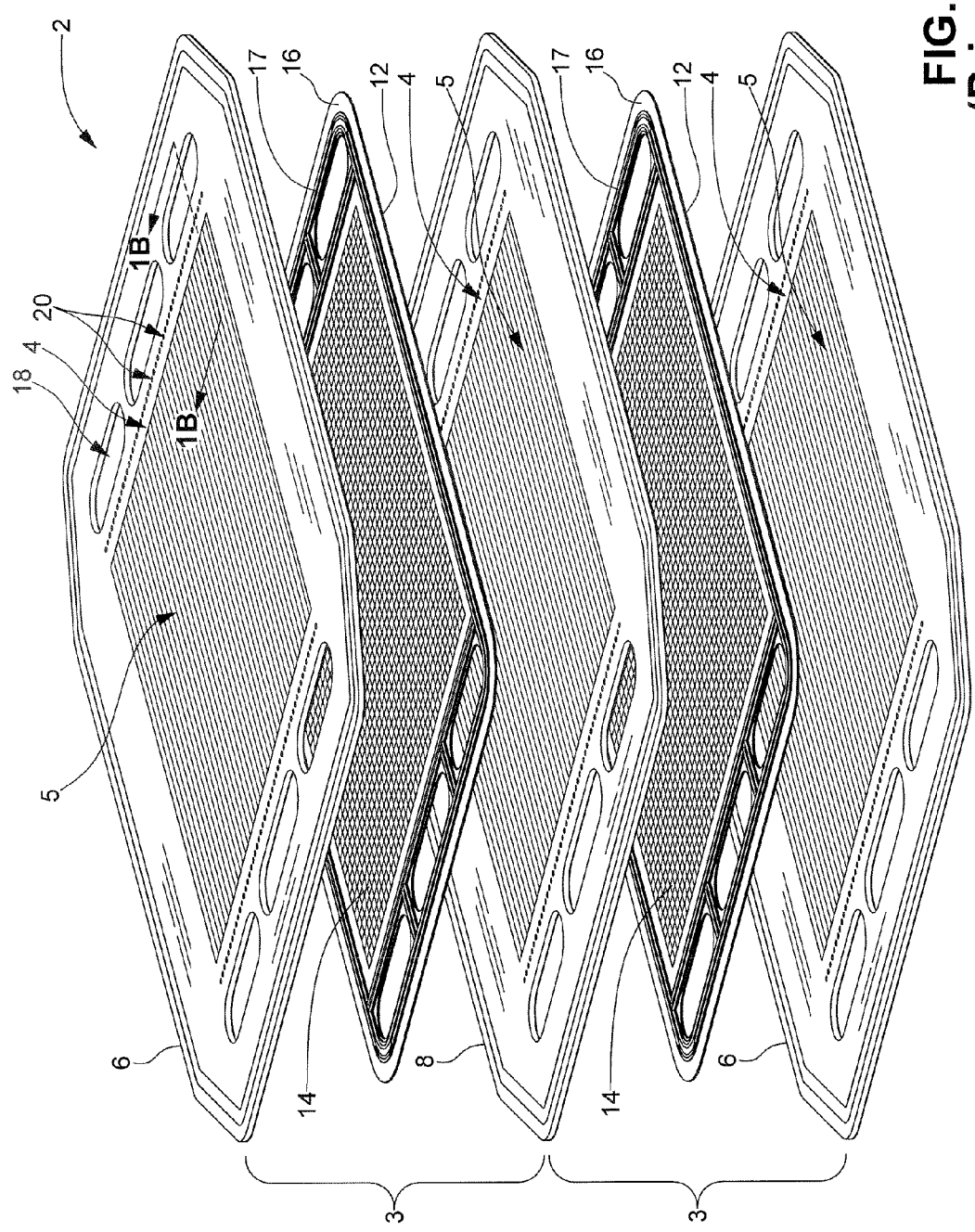
FIG. 1A illustrates a schematic, exploded perspective view of an illustrative PEM fuel cell stack of the prior art, showing only two cells.

The following description is merely exemplary in nature and is not intended to limit the present disclosure, application, or uses. It should also be understood that throughout the drawings, corresponding reference numerals indicate like or corresponding parts and features.

Figure 1B:
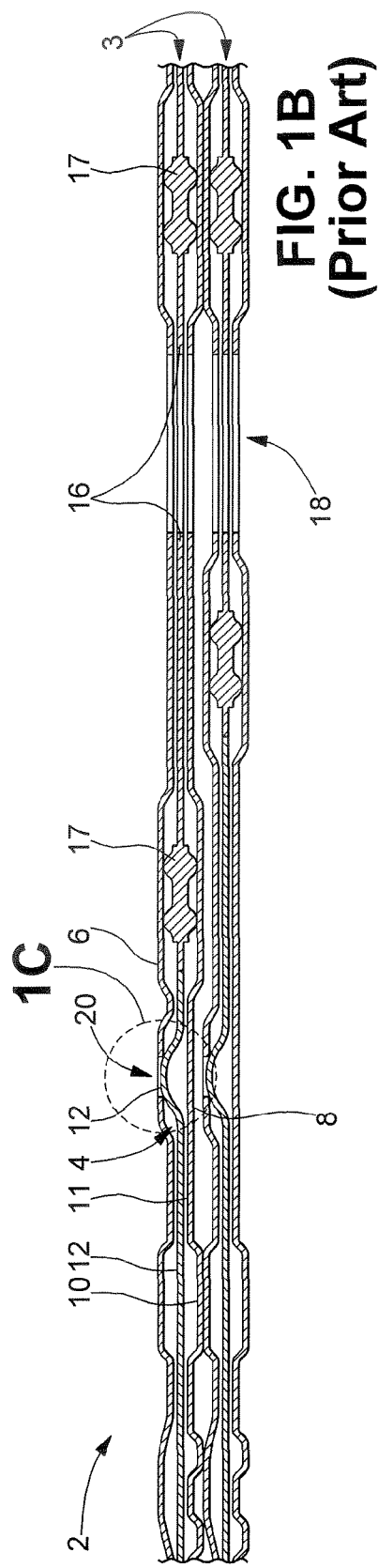
FIG. 1B is a fragmentary cross-sectional view of the fuel cell stack of FIG. 1A having a softgood component deflecting into a port of the fuel cell stack during an operation thereof.
Figure 1C:
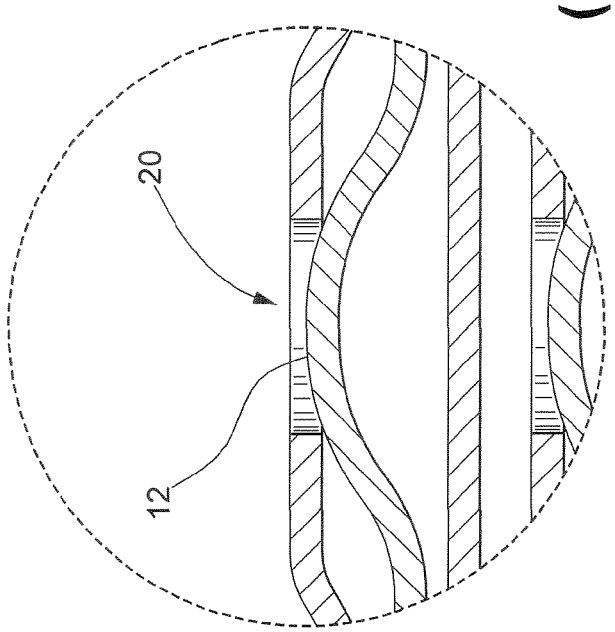
FIG. 1C is an enlarged, fragmentary cross-sectional view of the fuel cell stack shown in FIG. 1B.

FIGS. 1A, 1B, and 1C depict an exemplary fuel cell stack 2 of the prior art. For purposes of illustration, only two fuel cells 3 are shown, it being understood that a typical fuel cell stack 2 will have many more fuel cells 3. The fuel cells 3 are typically stacked together between a pair of clamping plates (not shown) and a pair of unipolar end plates (not shown). The fuel cell stack 2 has a feed region 4 configured to transport a gaseous reactant to or from an active region 5 the fuel cell stack 2.

The fuel cell stack 2 further includes a first plate 6 and a second plate 8. The first and second plates 6, 8 may be unipolar or bipolar plates, for example, having a plurality of flow channels 10 and a plurality of lands 11 formed thereon. The flow channels 10 are configured to deliver the gaseous reactants to the active region 5 of the fuel cell stack 2. It should be understood that the feed region 4 is generally disposed between the first and second plates 6, 8 when the fuel cell stack 2 is assembled. Similarly, the active region 5 is also disposed between the first and second plates 6, 8, adjacent the feed region 4, when the plates 6, 8 are assembled to form the fuel cell stack 2.

At least one unsupported softgood 12 of the fuel cell stack 2 is disposed between the first and second fuel cell plates 6, 8. As a nonlimiting example, the softgood 12 includes at least one of an electrolyte membrane and an anode or cathode. The electrolyte membrane, anode, and cathode may be assembled as an MEA 14, for example. The unsupported softgood 12 may further include other softgood 12 components as is known in the art. Being unsupported, the softgood 12 is not buttressed by a metal shim or foil. The softgood 12 may extend from the active region 5 of the fuel cell stack 2 to a gasket 16 disposed between the first and second fuel cell plates 6, 8. As a nonlimiting example, the softgood 12 is an electrolyte membrane that is disposed along both the active region 5 and the feed region 4 of the fuel cell stack 2, and ending substantially at the gasket 16. The gasket 16 may have at least one seal 17 formed thereon.

The softgood 12 may have a laminated structure. The laminated structure may include at least one of the electrolyte membrane, the anode, the cathode, the DM, and other suitable softgood components as desired. When the softgood 12 in the feed region 4 is one of the electrolyte membrane, the anode, and the cathode, the softgood 12 may be coated or laminated with a substantially inert material to militate against any undesired interaction with the first and second fuel cell plates 6, 8. The undesired interaction may include a corrosion of the first and second fuel cell plates 6, 8 and a degradation of the softgood 12.

The fuel cell stack 2 includes a manifold 18 formed by an alignment of respective manifold apertures in the fuel cell plates 6, 8 and the softgood component 12. The manifold 18 is in fluid communication with a source of the gaseous reactant, such as an air compressor or a hydrogen storage tank, for example. The manifold 18 is configured to deliver the gaseous reactant to the fuel cell stack 2 as desired, for example, via the feed region 4. In a particular embodiment, the feed region 4 is defined by a volume between the first and second plates 6, 8 adjacent the manifold 18. At least one of the seals 17 of the gasket 16 may be disposed adjacent the manifold 18 and militate against undesirable leakage of the gaseous reactant into the fuel cell stack 2.

The first fuel cell plate 6 has a plurality of ports 20 formed therein. At least one of the ports 20 is in fluid communication with the manifold 18. It should be understood that the ports 20 may include one of an inlet port configured to deliver gaseous reactants to the active region 5 of the fuel cell stack 2, and an outlet port configured to remove gaseous reactants from the active region 5.

As shown in FIGS. 1B and 1C, the unsupported softgood 12 may deflect into the port 20 during an operation of the fuel cell stack 2. The deflection may occur, for example, due to a pressure differential that occurs across the softgood 12. The pressure differential may result from a difference in pressure of the gaseous reactants on an anode side and a cathode side of the softgood 12. The deflection may occur due to a change in material integrity or stiffness at elevated temperatures attained during operation of the fuel cell stack 2. It should be appreciated that the forcing of the unsupported softgood 12 into the port 20 undesirably restricts a flow of the gaseous reactants to and from various regions of the fuel cell stack 2.

Various embodiments according to the present invention are shown in FIGS. 2 to 6. For purpose of clarity, related structure from FIGS. 1A, 1B, and 1C includes the same reference numeral with a prime (') symbol.

Referring to FIGS. 2 and 3, the fuel cell stack 2' of the disclosure includes a barrier film 200 disposed between the first and second plates 6', 8'. The barrier film 200 is formed from a polymeric membrane. The barrier film 200 does not degrade significantly with exposure to fuel cell operating temperatures and fluids, such as the gaseous reactants employed in the fuel cell 2' electrochemical reaction. The barrier film 200 may be a substantially homogenous sheet or a laminated structure adapted to optimize a strength thereof, as desired.

The barrier film 200 provides electrical insulation between individual cells of the fuel cell stack 2'. The barrier film 200 may also have at least one polymeric seal 202 formed thereon. As a nonlimiting example the barrier film 200 is formed from one of a polyethylene naphthalate (PEN), a polyethylene terephthalate (PET), and a polyimide polymer (for example, Kapton®). The polymeric seal 202 is formed from one of a silicone rubber, an ethylene propylene diene rubber (EPDM), and a fluorosilicone. It should be understood that other suitable polymeric materials for the barrier film 200 and the polymeric seal 202 may be selected as desired. A skilled artisan should also understand that the barrier film 200 and the polymeric seal 202 may be formed from the same material as desired.

The barrier film 200 is coupled to other softgoods (not shown) of the fuel cell stack 2'. As a nonlimiting example, the barrier film 200 may be coupled to at least one of an electrolyte membrane, an anode, and a cathode. In another embodiment, the barrier film 200 is coupled to a DM. In particular embodiments, the barrier film 200 is also coupled to a nonconductive gasket. For example, the barrier film 200 may be integral with the nonconductive gasket In a particularly illustrative embodiment, the barrier film 200 is coupled to both the electrolyte membrane and the nonconductive gasket.

The barrier film 200 may be coupled to the other softgoods of the fuel cell stack 2' by at least one of a chemical adhesive and physical bonding, such as a bonding caused by physical interlocking or friction under compression. It should be understood that at least one of the electrolyte membrane, the anode, the cathode, and the DM may be laminated with the barrier film 200 over a portion of the feed region 4'. In another embodiment, at least one of the electrolyte membrane, the anode, the cathode, and the DM does not extend substantially into the feed region 4'. Other suitable configurations may be selected as desired.

The barrier film 200 of the present disclosure has a plurality of support features 204. The support features 204 are adapted to militate against an undesired deflection of the barrier film 200 when a pressure differential forms across the barrier film 200. For example, when the fuel cell stack 2' has a pressure differential between a cathode side and an anode side of the barrier film 200, the support features 204 may abut the first plate 6' and buttress the barrier film 200. Since the support features 204 abut the first plate 6' and inhibit the deflection of the barrier film 200, an intrusion of the barrier film 200 into the port 20' is militated against.

The support features 204 of the barrier film 200 may be integral with the membrane 201. As shown in FIG. 2, at least one of the support features 204 may be a hollow node formed from the polymeric membrane of the barrier film 200. The hollow node may be formed by any suitable operation for forming nodes in the barrier film 200, such as by a molding operation or a stamping operation, for example. At least one of the support features may be a substantially solid node, such as shown in FIG. 3. In certain embodiments, the support features 204 are deposited on the barrier film 200. Suitable materials for the deposited support features 204 include those suitable for use as the polymeric membrane of the barrier film 200, and may be selected as desired. A skilled artisan should also appreciate that suitable support feature 204 shapes may be selected as desired.

Figure 4:
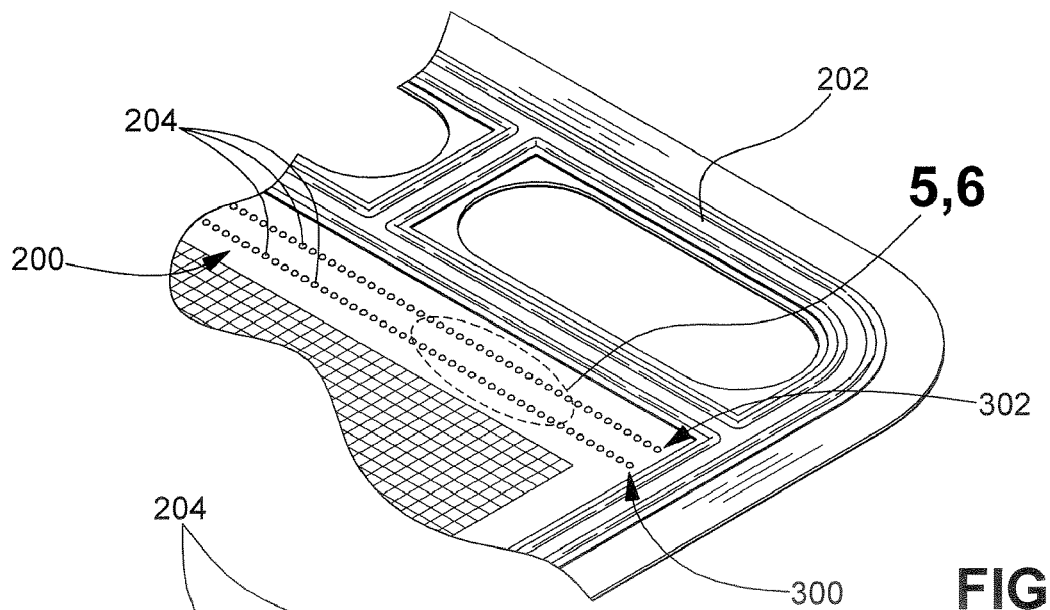
FIG. 4 is a partial perspective view of an illustrative barrier film showing a plurality of support features.
Figure 5:
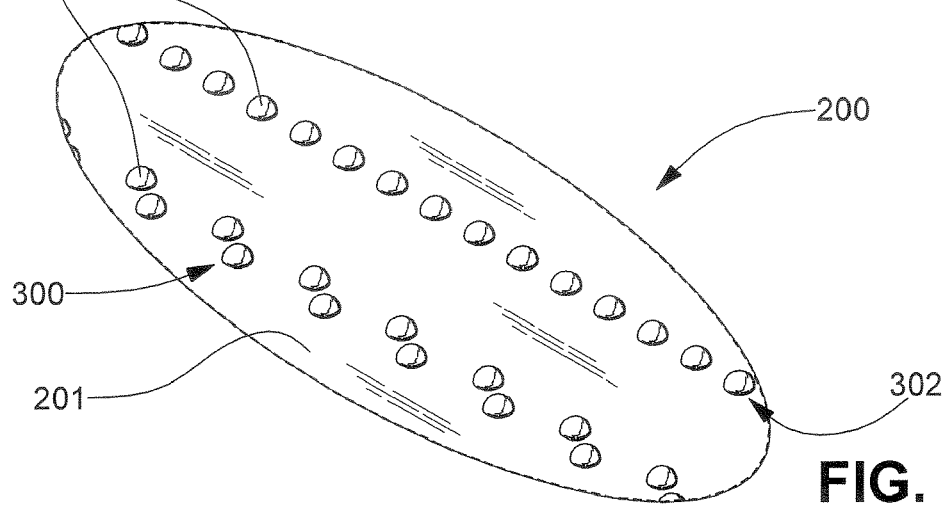
FIG. 5 is an enlarged, fragmentary perspective view of the barrier film depicted in FIG. 4 showing a staggering of the support features.

Referring to FIG. 4, the plurality of support features 204 may have a substantially columnar alignment on the barrier film 200. For example, the plurality of support features 204 includes a first quantity of support features 300 and a second quantity of support features 302. The first and second quantities 300, 302 are disposed in a spaced apart arrangement. In one embodiment, the first and second quantities 300, 302 are disposed on the barrier film 200 in columns that are substantially parallel to one another. Referring to FIG. 5, at least one of the first quantity 300 and the second quantity 302 of support features 204 may have a staggered alignment on the barrier film 200. Staggering the support features 204 may militate against a formation of an undesirable continuous bend deflection of the barrier film 200 in operation. Other suitable configurations of the plurality of support features 302 may also be selected.

Figure 6:
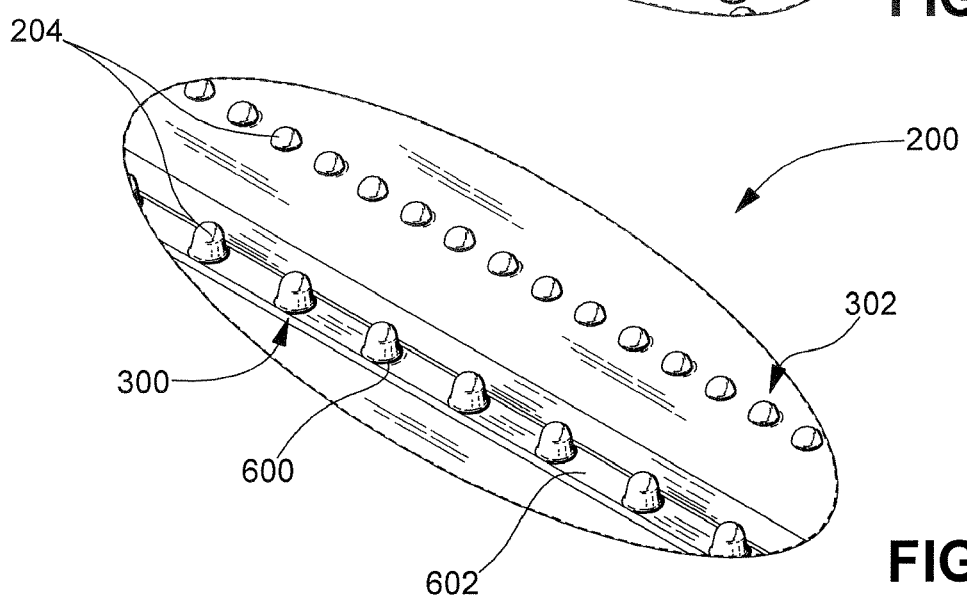
FIG. 6 is an enlarged, fragmentary perspective view of the barrier film depicted in FIG. 4 showing a biasing of the support features.

In particular embodiments, a base 600 of the support feature 204 may be disposed beneath a plane defined by a surface of the barrier film 200. As shown in FIG. 6, the first quantity 300 of support features 204 may be disposed in a channel 602 formed in the barrier film 200. The first and second quantities 300, 302 of the support features 204 may also be configured to bias the barrier film 200 in a desired direction. The bias induced in the barrier film 200 may be sufficient to create a desirable bend deflection of the barrier film 200 in operation. It should be understood that a biasing of the barrier film 200 may increase a beam strength of additional components disposed on the barrier film in a direction perpendicular to the bend direction.

It is surprisingly found that the inclusion of the support features 204 on the barrier film 200 of the present disclosure minimizes an intrusion of the barrier film 200 and any other laminated softgoods into the port 20'. The minimization of the softgood intrusion with barrier film 200 militates against low performing cell (LPC) conditions, fuel cell instability, and reactant starvation or non-uniformity of reactant flow to the fuel cell and the resultant fuel cell degradation.

While certain representative embodiments and details have been shown for purposes of illustrating the invention, it will be apparent to those skilled in the art that various changes may be made without departing from the scope of the disclosure, which is further described in the following appended claims.

What is claimed is:

1. A fuel cell, comprising:
   a first plate having a port and a manifold aperture formed therein, the port disposed inboard from the manifold aperture;
   a second plate having a manifold aperture formed therein and disposed adjacent the first plate, the first plate and the second plate having flow fields formed thereon, each of the flow fields including a plurality of flow channels defined by a plurality of lands;
   a barrier film disposed between the first plate and the second plate, a volume between the first plate and the second plate adjacent a supply manifold formed by an alignment of the manifold apertures in the first plate and the second plate defining a feed region of the fuel cell, the barrier film disposed in the feed region, wherein the barrier film is a polymeric membrane having at least one deflectable portion adjacent the port and a seal formed thereon between the deflectable portion and the supply manifold outboard from the port, the seal abutting each of the first plate and the second plate, the deflectable portion further having a plurality of support features, the support features disposed between at least one of the lands of the second plate and the flow channels of the first plate and the flow channels of the second plate and the flow channels of the first plate, and a height of the support features being greater than a thickness of the deflectable portion of the barrier film, each of the support features abutting the first plate at a position adjacent and inboard from the port to militate against an intrusion of the barrier film into the port due to a pressure differential across the barrier film;
   an anode;
   an electrolyte membrane; and
   a cathode, wherein the anode, the electrolyte membrane, and the cathode are disposed between the first plate and the second plate in an active region, the electrolyte membrane coupled to the barrier film, and wherein the cathode, the anode, and the electrolyte membrane do not extend substantially into the feed region.

2. The fuel cell of claim 1, wherein the support features are at least one of integral with the membrane and deposited on the barrier film.

3. The fuel cell of claim 1, wherein one of the support features is a substantially solid node.

4. The fuel cell of claim 1, wherein one of the support features is a hollow node formed from the barrier film.

5. The fuel cell of claim 4, wherein the hollow node is formed by one of a molding operation and a stamping operation.

6. The fuel cell of claim 4, wherein a base of the hollow node is spaced from a plane defined by a surface of the barrier film.

7. The fuel cell of claim 1, wherein the plurality of support features has a substantially columnar alignment on the barrier film.

8. The fuel cell of claim 1, wherein the plurality of support features includes a first quantity of support features spaced apart from a second quantity of support features.

9. The fuel cell of claim 8, wherein the first quantity and the second quantity of support features are arranged in columns substantially parallel to one another.

10. The fuel cell of claim 8, wherein the first quantity and the second quantity of support features bias the membrane in a desired direction.

11. The fuel cell of claim 1, wherein the plurality of support features has a staggered alignment on the barrier film.

12. The fuel cell of claim 1, wherein the barrier film is formed from at least one of a polyethylene terephthalate (PET), a polyethylene naphthalate (PEN), and a polyimide polymer.

13. The fuel cell of claim 1, wherein the barrier film is laminated from a plurality of membrane layers.

14. A fuel cell stack comprising:
 a plurality of fuel cells, at least one of the fuel cells further comprising:
 a first plate having a port and a manifold aperture formed therein, the port disposed inboard from the manifold aperture;
 a second plate having a manifold aperture formed therein and disposed adjacent the first plate, the first plate and the second plate having flow fields formed thereon, each of the flow fields including a plurality of flow channels defined by a plurality of lands;
 a barrier film disposed between the first plate and the second plate, a volume between the first plate and the second plate adjacent a supply manifold formed by an alignment of the manifold apertures in the first plate and the second plate defining a feed region of the fuel cell, the barrier film disposed in the feed region, wherein the barrier film is a polymeric membrane having at least one deflectable portion adjacent the port and a seal formed thereon between the deflectable portion and the supply manifold outboard from the port, the seal abutting each of the first plate and the second plate, the deflectable portion having a plurality of support features, the support features disposed between at least one of the lands of the second plate and the flow channels of the first plate and the flow channels of the second plate and the flow channels of the first plate, and a height of the support features being greater than a thickness of the deflectable portion of the barrier film, each of the support features abutting the first plate at a position adjacent and inboard from the port to militate against an intrusion of the barrier film into the port due to a pressure differential across the barrier film;
 an anode;
 an electrolyte membrane; and
 a cathode, wherein the anode, the electrolyte membrane, and the cathode are disposed between the first plate and the second plate in an active region, the electrolyte membrane coupled to the barrier film, and wherein the cathode, the anode, and the electrolyte membrane do not extend substantially into the feed region.

* * * * *